(12) United States Patent
Samuelsson et al.

(10) Patent No.: US 9,047,473 B2
(45) Date of Patent: Jun. 2, 2015

(54) SYSTEM AND METHOD FOR SECOND FACTOR AUTHENTICATION SERVICES

(71) Applicant: Anakam, Inc., Reston, VA (US)

(72) Inventors: Jonas Samuelsson, San Diego, CA (US); Allan Camaisa, La Jolla, CA (US)

(73) Assignee: Anakam, Inc., Reston, VA (US)

( * ) Notice: Subject to any disclaimer, the term of this patent is extended or adjusted under 35 U.S.C. 154(b) by 0 days.

(21) Appl. No.: 14/015,161

(22) Filed: Aug. 30, 2013

(65) Prior Publication Data

US 2013/0347129 A1 Dec. 26, 2013

Related U.S. Application Data

(63) Continuation of application No. 12/142,232, filed on Jun. 19, 2008, now Pat. No. 8,533,791, and a continuation-in-part of application No. 11/824,694, filed on Jul. 2, 2007, now Pat. No. 8,528,078, and a continuation-in-part of application No. 11/257,421, filed on Oct. 24, 2005, now Pat. No. 8,219,822, and a continuation-in-part of application No. 11/077,948, filed on Mar. 11, 2005, now Pat. No. 8,079,070, and a continuation-in-part of application No. 10/892,584, filed on Jul. 15, 2004, now Pat. No. 7,676,834.

(51) Int. Cl.
| | |
|---|---|
| *H04L 29/06* | (2006.01) |
| *G06F 21/60* | (2013.01) |
| *H04L 9/32* | (2006.01) |
| *G06F 21/40* | (2013.01) |

(52) U.S. Cl.
CPC .............. *G06F 21/60* (2013.01); *H04L 9/321* (2013.01); *H04L 9/3231* (2013.01); *H04L 9/3273* (2013.01); *H04L 63/0838* (2013.01); *H04L 63/0861* (2013.01); *H04L 63/18* (2013.01); *G06F 21/40* (2013.01)

(58) Field of Classification Search
None
See application file for complete search history.

(56) References Cited

U.S. PATENT DOCUMENTS

| | | |
|---|---|---|
| 4,869,717 A | 9/1989 | Adair |
| 5,590,199 A | 12/1996 | Krajewski et al. |
| 5,737,421 A | 4/1998 | Audebert |
| 5,802,176 A | 9/1998 | Audebert |
| 5,887,065 A | 3/1999 | Audebert |

(Continued)

FOREIGN PATENT DOCUMENTS

| | | |
|---|---|---|
| EP | 2425583 | 3/2012 |
| EP | 1766839 | 3/2013 |

(Continued)

OTHER PUBLICATIONS

U.S. Appl. No. 10/892,584, complete file history of application (487 pages).

(Continued)

*Primary Examiner* — Gilberto Barron, Jr.
*Assistant Examiner* — Simon Kanaan
(74) *Attorney, Agent, or Firm* — Kilpatrick Townsend & Stockton LLP

(57) ABSTRACT

A customer server receives a client request to access protected resources over the Internet. First factor authentication is performed and if it is successful a vendor authentication engine is invoked to undertake second factor authentication. The results of the second factor authentication are returned to the customer server, which grants access only if both first and second factor authentication succeeds.

16 Claims, 11 Drawing Sheets

(56) References Cited

U.S. PATENT DOCUMENTS

| | | |
|---|---|---|
| 5,937,068 A | 8/1999 | Audebert |
| 5,982,898 A | 11/1999 | Hsu et al. |
| 6,035,404 A | 3/2000 | Zhao |
| 6,047,268 A | 4/2000 | Bartoli et al. |
| 6,076,163 A | 6/2000 | Hoffstein et al. |
| 6,085,320 A | 7/2000 | Kaliski, Jr. |
| 6,130,621 A | 10/2000 | Weiss |
| 6,157,920 A | 12/2000 | Jakobsson et al. |
| 6,189,098 B1 | 2/2001 | Kaliski, Jr. |
| 6,202,159 B1 | 3/2001 | Ghafir et al. |
| 6,240,184 B1 | 5/2001 | Huynh |
| 6,269,163 B1 | 7/2001 | Rivest et al. |
| 6,286,022 B1 | 9/2001 | Kaliski, Jr. et al. |
| 6,301,362 B1 | 10/2001 | Matyas, Jr. et al. |
| 6,308,268 B1 | 10/2001 | Audebert |
| 6,317,777 B1 | 11/2001 | Skarbo et al. |
| 6,373,969 B1 | 4/2002 | Adler |
| 6,374,359 B1 | 4/2002 | Shrader et al. |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,429,927 B1 | 8/2002 | Borza |
| 6,434,259 B1 | 8/2002 | Hamid et al. |
| 6,446,052 B1 | 9/2002 | Juels |
| 6,446,210 B1 | 9/2002 | Borza |
| 6,460,141 B1 | 10/2002 | Olden |
| 6,498,861 B1 | 12/2002 | Hamid et al. |
| 6,584,505 B1 | 6/2003 | Howard et al. |
| 6,598,072 B1 | 7/2003 | McBrearty et al. |
| 6,662,231 B1 | 12/2003 | Drosset et al. |
| 6,694,436 B1 | 2/2004 | Audebert |
| 6,700,606 B1 | 3/2004 | Borza |
| 6,721,891 B1 | 4/2004 | Borza |
| 6,751,654 B2 | 6/2004 | Massarani et al. |
| 6,760,844 B1 | 7/2004 | McCarthy et al. |
| 6,769,068 B1 | 7/2004 | Brozowski et al. |
| 6,772,954 B2 | 8/2004 | Boyer et al. |
| 6,813,354 B1 | 11/2004 | Jakobsson et al. |
| 6,831,980 B1 | 12/2004 | Borza et al. |
| 6,836,845 B1 | 12/2004 | Lennie |
| 6,848,052 B2 | 1/2005 | Hamid |
| 6,857,078 B2 | 2/2005 | Colvin |
| 6,983,061 B2 * | 1/2006 | Ikegami et al. ............... 382/115 |
| 7,032,026 B1 | 4/2006 | Biswas |
| 7,100,049 B2 | 8/2006 | Gasparini et al. |
| 7,275,263 B2 | 9/2007 | Bajikar et al. |
| 7,345,775 B2 | 3/2008 | Kimura |
| 7,346,775 B2 | 3/2008 | Gasparinl et al. |
| 7,360,096 B2 | 4/2008 | Bracewell et al. |
| 7,418,596 B1 | 8/2008 | Carroll et al. |
| 7,426,530 B1 | 9/2008 | Rosko et al. |
| 7,437,408 B2 | 10/2008 | Schwartz et al. |
| 7,464,162 B2 | 12/2008 | Chan |
| 7,536,433 B2 | 5/2009 | Reilly |
| 7,562,222 B2 | 7/2009 | Gasparini et al. |
| 7,571,466 B2 | 8/2009 | Mitchell et al. |
| 7,665,127 B1 | 2/2010 | Rao et al. |
| 7,676,834 B2 | 3/2010 | Camaisa et al. |
| 7,685,631 B1 | 3/2010 | Paya et al. |
| 7,725,490 B2 | 5/2010 | Hitchen et al. |
| RE41,546 E | 8/2010 | Vainstein |
| 7,813,986 B2 | 10/2010 | Gardner et al. |
| 7,822,989 B2 | 10/2010 | Libin et al. |
| 7,840,573 B2 | 11/2010 | Adams et al. |
| 8,006,300 B2 | 8/2011 | Mizrah |
| 8,078,873 B2 | 12/2011 | Shah et al. |
| 8,079,070 B2 | 12/2011 | Camaisa |
| 8,219,822 B2 | 7/2012 | Camaisa et al. |
| 8,296,562 B2 | 10/2012 | Williams et al. |
| 8,528,078 B2 | 9/2013 | Camaisa et al. |
| 8,533,791 B2 | 9/2013 | Samuelsson et al. |
| 2001/0014895 A1 | 8/2001 | Sappal |
| 2001/0029585 A1 | 10/2001 | Simon et al. |
| 2001/0036297 A1 | 11/2001 | Ikegami et al. |
| 2001/0037451 A1 | 11/2001 | Bhagavatula |
| 2001/0037466 A1 | 11/2001 | Fukutake et al. |
| 2001/0044896 A1 | 11/2001 | Schwartz et al. |
| 2002/0029279 A1 | 3/2002 | Campbell et al. |
| 2002/0031230 A1 | 3/2002 | Sweet et al. |
| 2002/0059425 A1 | 5/2002 | Belfiore |
| 2002/0073042 A1 | 6/2002 | Maritzen et al. |
| 2002/0087894 A1 * | 7/2002 | Foley et al. ................... 713/202 |
| 2002/0131402 A1 | 9/2002 | Lee et al. |
| 2002/0133706 A1 | 9/2002 | Khanna et al. |
| 2002/0169961 A1 | 11/2002 | Giles et al. |
| 2002/0169988 A1 | 11/2002 | Vandergeest et al. |
| 2002/0184496 A1 | 12/2002 | Mitchell et al. |
| 2003/0005308 A1 | 1/2003 | Rathbun et al. |
| 2003/0018707 A1 | 1/2003 | Flocken |
| 2003/0033245 A1 | 2/2003 | Kahr |
| 2003/0046551 A1 | 3/2003 | Brennan |
| 2003/0093430 A1 | 5/2003 | Mottur |
| 2003/0097573 A1 | 5/2003 | Wheeler |
| 2003/0140230 A1 | 7/2003 | De Jong et al. |
| 2003/0149900 A1 | 8/2003 | Glassman et al. |
| 2003/0154406 A1 | 8/2003 | Honarvar et al. |
| 2003/0159068 A1 | 8/2003 | Halpin et al. |
| 2003/0163739 A1 * | 8/2003 | Armington et al. ........... 713/202 |
| 2003/0177351 A1 | 9/2003 | Skingle |
| 2003/0188186 A1 | 10/2003 | Cherry |
| 2003/0200202 A1 | 10/2003 | Hsiao |
| 2003/0217288 A1 | 11/2003 | Guo et al. |
| 2003/0229782 A1 | 12/2003 | Bible, Jr. et al. |
| 2004/0059951 A1 | 3/2004 | Pinkas et al. |
| 2004/0098609 A1 | 5/2004 | Bracewell et al. |
| 2004/0103203 A1 | 5/2004 | Nichols et al. |
| 2004/0103297 A1 | 5/2004 | Risan et al. |
| 2004/0103300 A1 | 5/2004 | Risan et al. |
| 2004/0111621 A1 | 6/2004 | Himberger et al. |
| 2004/0123103 A1 | 6/2004 | Risan et al. |
| 2004/0136510 A1 | 7/2004 | Vander Veen |
| 2004/0139318 A1 | 7/2004 | Fiala et al. |
| 2004/0143523 A1 | 7/2004 | Pegaz-Paquet et al. |
| 2004/0168083 A1 | 8/2004 | Gasparini et al. |
| 2004/0172535 A1 | 9/2004 | Jakobsson et al. |
| 2004/0186995 A1 | 9/2004 | Yim et al. |
| 2004/0187018 A1 | 9/2004 | Owen et al. |
| 2004/0250076 A1 | 12/2004 | Kung |
| 2005/0015601 A1 | 1/2005 | Tabi |
| 2005/0054994 A1 | 3/2005 | Cioanta et al. |
| 2005/0108551 A1 | 5/2005 | Toomey |
| 2005/0138109 A1 | 6/2005 | Redlich et al. |
| 2005/0154887 A1 | 7/2005 | Birk et al. |
| 2005/0160042 A1 | 7/2005 | Russell et al. |
| 2005/0165276 A1 | 7/2005 | Belson et al. |
| 2005/0176449 A1 | 8/2005 | Cui et al. |
| 2005/0177730 A1 | 8/2005 | Davenport et al. |
| 2005/0183032 A1 | 8/2005 | Bushey et al. |
| 2005/0228993 A1 | 10/2005 | Silvester et al. |
| 2005/0268100 A1 | 12/2005 | Gasparini et al. |
| 2005/0268107 A1 | 12/2005 | Harris |
| 2005/0269401 A1 | 12/2005 | Spitzer et al. |
| 2006/0015742 A1 | 1/2006 | Camaisa et al. |
| 2006/0015743 A1 | 1/2006 | Camaisa et al. |
| 2006/0069921 A1 | 3/2006 | Camaisa |
| 2006/0106605 A1 | 5/2006 | Saunders et al. |
| 2006/0206709 A1 | 9/2006 | Labrou et al. |
| 2007/0123840 A1 | 5/2007 | Cox |
| 2007/0136517 A1 | 6/2007 | Edling |
| 2007/0136573 A1 | 6/2007 | Steinberg |
| 2007/0163585 A1 | 7/2007 | Uesugi et al. |
| 2007/0180496 A1 | 8/2007 | Fransdonk |
| 2007/0203517 A1 | 8/2007 | Williams et al. |
| 2007/0266257 A1 | 11/2007 | Camaisa et al. |
| 2008/0091682 A1 | 4/2008 | Lim |
| 2008/0098464 A1 | 4/2008 | Mizrah |
| 2008/0114980 A1 | 5/2008 | Sridhar |
| 2008/0189776 A1 | 8/2008 | Constable |
| 2008/0201159 A1 | 8/2008 | Gabrick et al. |
| 2008/0250477 A1 | 10/2008 | Samuelsson et al. |
| 2008/0301570 A1 | 12/2008 | Milstead et al. |
| 2009/0094674 A1 | 4/2009 | Schwartz et al. |
| 2009/0167486 A1 | 7/2009 | Shah et al. |
| 2009/0235339 A1 | 9/2009 | Mennes et al. |

(56) References Cited

U.S. PATENT DOCUMENTS

| | | | |
|---|---|---|---|
| 2009/0259848 | A1 | 10/2009 | Williams et al. |
| 2009/0327724 | A1 | 12/2009 | Shah et al. |
| 2010/0100967 | A1 | 4/2010 | Douglas et al. |
| 2010/0185860 | A1 | 7/2010 | Mishra et al. |

FOREIGN PATENT DOCUMENTS

| | | |
|---|---|---|
| WO | 03007571 | 1/2003 |
| WO | 2010127263 | 6/2012 |

OTHER PUBLICATIONS

U.S. Appl. No. 11/077,948, "Non-Final Office Action", mailed Oct. 16, 2008 (11 pages).
U.S. Appl. No. 11/077,948, "Non-Final Office Action", mailed Apr. 9, 2009 (8 pages).
U.S. Appl. No. 11/077,948, "Non-Final Office Action", mailed Jul. 16, 2009 (8 pages).
U.S. Appl. No. 11/077,948, "Final Office Action", mailed Dec. 7, 2010 (11 pages).
U.S. Appl. No. 11/077,948, "Non-Final Office Action", Jan. 24, 2011 (10 pages).
U.S. Appl. No. 11/077,948, "Notice of Allowance", mailed Aug. 12, 2011 (11 pages).
U.S. Appl. No. 11/077,948, "Supplemental Notice of Allowance", mailed Sep. 15, 2011 (3 pages).
U.S. Appl. No. 11/257,421, "Office Action", mailed Dec. 29, 2008 (12 pages).
U.S. Appl. No. 11/257,421, "Final Office Action", mailed Apr. 20, 2009 (21 pages).
U.S. Appl. No. 11/257,421, "Office Action", mailed Apr. 14, 2010 (25 pages).
U.S. Appl. No. 11/257,421, "Final Office Action", mailed 7/72010 (29 pages).
U.S. Appl. No. 11/257,421, "Office Action", mailed Nov. 28, 2011 (6 pages).
U.S. Appl. No. 11/257,421, "Notice of Allowance", mailed Mar. 19, 2012 (9 pages).
U.S. Appl. No. 11/824,694, "Office Action", mailed Jun. 10, 2010 (38 pages).
U.S. Appl. No. 11/824,694, "Final Office Action", mailed Aug. 31, 2010 (42 pages).
U.S. Appl. No. 11/824,694, "Office Action", mailed Jan. 10, 2011 (30 pages).
U.S. Appl. No. 11/824,694, "Final Office Action", mailed Mar. 1, 2011 (33 pages).
U.S. Appl. No. 11/824,694, "Office Action", mailed Sep. 19, 2011 (27 pages).
U.S. Appl. No. 11/824,694, "Office Action Response", filed Jan. 19, 2012 (31 pages).
U.S. Appl. No. 11/824,694, "Office Action", mailed Mar. 29, 2012 (37 pages).
U.S. Appl. No. 11/824,694, "Office Action", mailed Jul. 30, 2012 (38 pages).
U.S. Appl. No. 11/824,694, "Office Action", mailed Feb. 5, 2013 (42 pages).
U.S. Appl. No. 11/824,694, "Notice of Allowance", mailed Apr. 29, 2013 (18 pages).
U.S. Appl. No. 11/824,694, "Corrected Notice of Allowance", mailed Jul. 17, 2013 (2 pages).
U.S. Appl. No. 12/142,232, "Final Office Action", mailed Mar. 29, 2011 (37 pages).
U.S. Appl. No. 12/142,232, "Notice of Allowance", mailed May 10, 2013 (14 Pages).
U.S. Appl. No. 12/142,232, "Office Action", mailed Dec. 9, 2010 (11 pages).
U.S. Appl. No. 12/142,232, "Office Action", mailed Oct. 6, 2011 (13 pages).
U.S. Appl. No. 12/142,232, "Office Action", mailed Nov. 26, 2012 (20 pages).
European Patent Application No. 05750620.6, "Communication Pursuant to Article 94(3) EPC", mailed Dec. 23, 2010 (5 pages).
European Patent Application No. 05750620.6, "Invitation Pursuant to Article 94(3) and Rule 71(1) EPC", mailed May 4, 2012 (2 pages).
European Patent Application No. 05750620.6, "Supplementary European Search Report", mailed May 4, 2010 (3 pages).
International Patent Application No. PCT/US10/33194, "International Search Report and Written Opinion", mailed Jun. 24, 2010 (3 pages).
International Patent Application No. PCT/US2010/033194, "International Preliminary Report on Patentability", May 24, 2012 (6 pages).
Piscitello et al., "Best Practices for securing enterprise network", Business Communications Review, Hinsdale, vol. 32, Iss. 12;, Dec. 2002 (8 pages).
Rodry, "Cookie based authentication: is it secure?", http://www.perimonks.org?node.sub--id=29228, Retrieved data Apr. 29, 2009, published on Aug. 18, 2000 (4 pages).

* cited by examiner

ARCHITECTURE

CUSTOMER SERVER LOGIC

SYSTEM AND METHOD FOR SECOND FACTOR AUTHENTICATION SERVICES

CROSS-REFERENCE TO RELATED APPLICATIONS

This is a continuation of U.S. patent application Ser. No. 12/142,232 filed Jun. 19, 2008 (allowed), which is a continuation-in-part of U.S. patent application Ser. No. 11/824,694 filed Jul. 2, 2007 (allowed), which is a continuation-in-part of U.S. Pat. No. 8,219,822 issued Jul. 10, 2012, which is a continuation-in-part of U.S. Pat. No. 8,079,070 issued Dec. 13, 2011, which is a continuation-in-part of U.S. Pat. No. 7,676,834 issued Mar. 9, 2010, all of which are incorporated herein by reference and from all of which is priority claimed.

FIELD OF THE INVENTION

The present invention relates generally to providing secure access to a website with sensitive data.

BACKGROUND OF THE INVENTION

The parent applications referenced above recognize the importance of providing more than simple user name/password protection for sensitive online data, and accordingly provide minimally intrusive second factor authentication systems and methods. As understood herein, some customers may prefer to handle first factor authentication (user name and password) themselves and use a vendor second-factor authentication in conjunction therewith.

SUMMARY OF THE INVENTION

A method for selectively granting a user access to data includes, at a first authentication server provided by a first vendor, receiving a request for access from a user computer. The method also includes using signals from the user computer to provide first factor authentication of the user. Only if first factor authentication is successful, a second factor authentication engine provided by a second vendor different from the first vendor is used to provide second factor authentication of the user. The user is granted access to the data only if second factor authentication is successful.

The first factor authentication may be executed by the first authentication server and may include testing for correct user name and password. The second factor authentication may include determining whether a previously submitted one-time pass code is valid. The pass code is generated as soon as the first factor authentication is successful and is delivered out-of-band by email, cell phone (SMS text message), or voice (interactive voice response ("IVR")). The pass code is for one-time use and may have a time expiration associated with it. In another aspect, a second factor authentication engine is disclosed on a tangible computer readable medium executable by a processor to execute logic. The logic includes receiving from a customer's system an indication that a user name of a user and an associated password have been verified, and undertaking second factor authentication of the user on behalf of the customer. The logic also includes returning to the customer system an indication of results of second factor authentication.

In another aspect, a server has a processor and a tangible computer readable medium accessible by the processor and bearing instructions embodying logic. The logic includes receiving a user request to access information and in response to the request, causing a user name and password received from the user to be authenticated. If the user name and password are not authenticated, the logic denies the user access to the information. Only if the user name and password are authenticated, a vendor authentication engine undertakes a second factor authentication and generates a result, and the logic receives the result from the engine. If the result indicates that second factor authentication fails, the logic denies the user access to the information, but otherwise grants the user access to the information.

DETAILED DESCRIPTION

Figure 1:
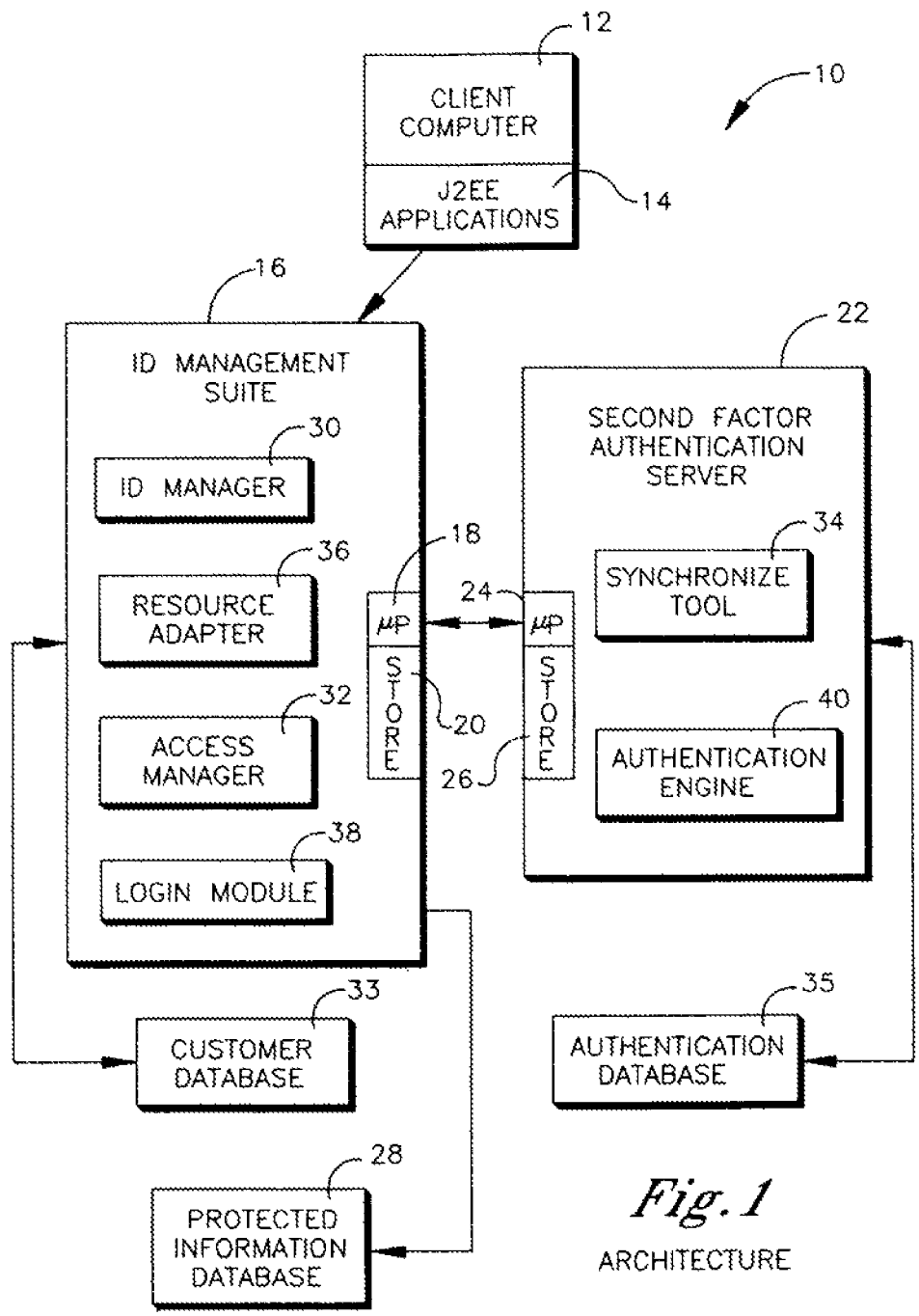
FIG. 1 is a block diagram of an exemplary system for implementing the present invention.

Referring initially to FIG. 1, a system is shown, generally designated 10, which supports resource requests by client computers 12 executing, in one implementation, Java 2 platform, enterprise edition ("J2EE") applications 14. The requests are sent to a customer server 16 having one or more server processors 18 accessing one or more tangible computer readable media 20 bearing instructions including portions of the logic discussed below. The media 20 may be, without limitation, solid-state memory, disk-based memory, or other memory or combination thereof.

As set forth further below, the customer server 16 executes first factor authentication of the user of the client computer 12, and if first factor authentication is successful, accesses a vendor-provided second factor authentication server 22 that may include one or more processors 24 accessing one or more tangible computer readable media 26 bearing instructions including portions of the logic discussed below. The media 26 may be, without limitation, solid-state memory, disk-based memory, or other memory or combination thereof. Only if both first- and second-factor authentication is successful is the client computer 12 permitted to access a protected information database 28 associated with the customer server 16. In some embodiments, the second factor authentication server 22 may execute both first- and second factor authentication.

In one example embodiment, the customer server 16 may execute a Java Identity Management Suite including a Java System Identity Manager ("IDM") 30 and a Java System Access Manager ("AM") 32 from, e.g., Sun Microsystems, to provide integrated user provisioning, de-provisioning, and identities management as discussed below. The AM 32, in an example embodiment, can be used to handle the first factor authentication process, which can be, e.g., requesting entry of a user name and password by the client computer 12 and then determining whether the user name and password match an approved user name and password in a user database 33 accessible to the customer server 16. On the other hand, the IDM 30 can be used to provision and de-provision users for second factor authentication by communicating user data to a synchronization utility 34 in the second factor authentication server 22. In non-limiting embodiments the user data sent from the IDM 30 to the utility 34 may include, e.g., user name, user email address, user home/office phone number, user mobile phone number and carrier, user's actual first and last names, user's address, and user's authentication profile as discussed further below. The user data may be stored in a database 35 accessible to the second factor authentication server 22.

Thus, the user data in the database 35 is collected not by the second factor authentication server 22 but by the customer server 16. The user data is uploaded to the database 35, with a synchronous connection being maintained between the customer server 16 and second factor authentication server 22 during operations. User self-registration may also be provided in which each user enters his two-factor data directly into the second factor authentication server 22.

Additionally, as shown in FIG. 1 the customer server 16 may include an IDM Resource Adapter 36, which functions as an interface to external subsystems and applications, translating and converting data between the systems into the proper format needed by each system.

Furthermore, the customer server 16 may include a vendor-provided login module 38, typically provided by the same vendor providing the second factor authentication programming of the second factor authentication server 22. In an example non-limiting implementation, the login module 38 is a Java Authentication and Authorization Service ("JAAS")-compliant module that is used to facilitate providing second factor authentication services to the AM 32 by communicating with a second factor authentication engine 40 in the second factor authentication server 22 when first factor authentication executed by the AM 32 is successful. In some embodiments, the second factor authentication server 22 may return, pursuant to execution of second factor authentication, HTML snippets that are transformed by the login module 38 into a format suitable for use via AM 32 callback routines. The login module 38 also transforms values from the customer server 16 into a format suitable for use with the second factor authentication engine 40.

Figure 2:
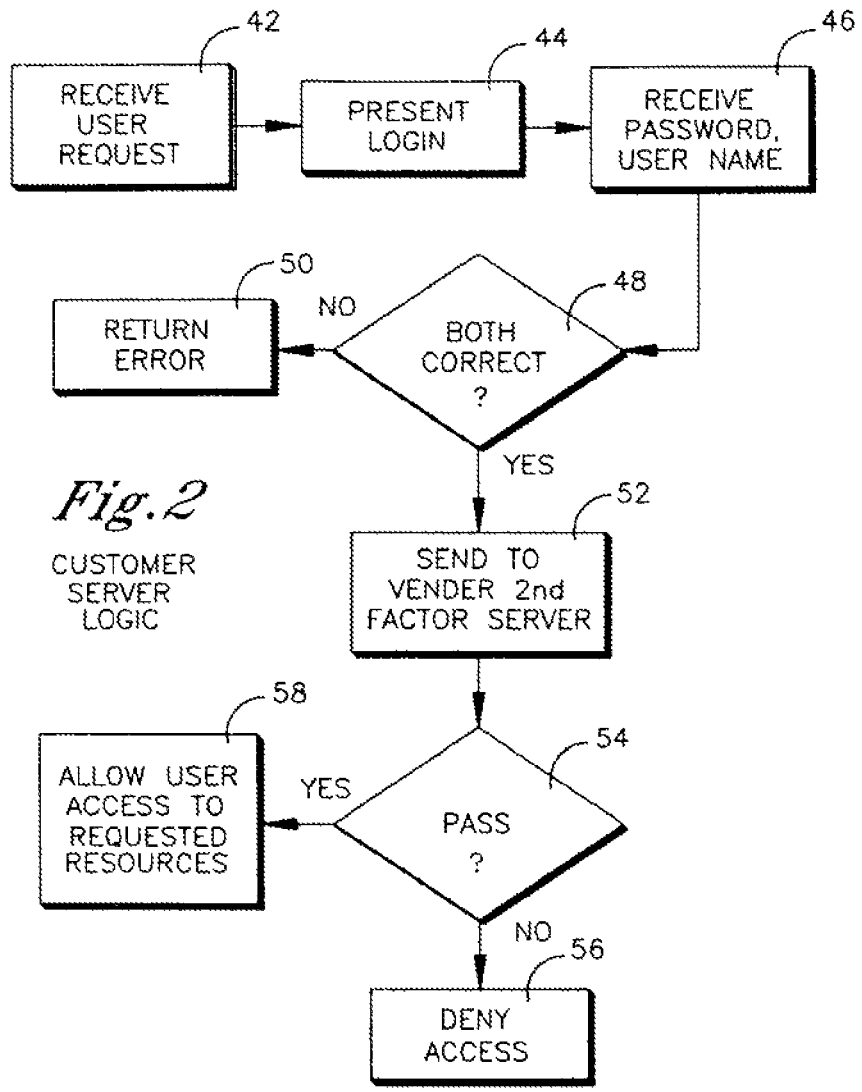
FIG. 2 is a flow chart of the customer server logic.

FIG. 2 shows logic that may be executed by the customer server 16 in one implementation. Commencing at block 42, a user request for access to protected information in the database 28 is received from the client computer 12 by the customer server 16, typically over the Internet. At block 44, the customer server 16 presents a login screen to the client computer 12 prompting the user to enter a user name and password, and assuming the user enters a user name and password, this information is received by the customer server 16 at block 46.

At decision diamond 48 it is determined whether both the user name and password are correct, i.e., whether they match a paired entry in a user database. The decision at diamond 48 may be executed by the customer server 16 using, e.g., the AM 32, or the login module 38 of the customer server 16 may pass the user name and password to the second factor authentication server 22, which makes the determination at diamond 48. If either the user name or password is incorrect (in some embodiments, after a predetermined number of retries), an error is returned at state 50.

Otherwise, first factor authentication of the user is successful and the logic flows to block 52 to send a request for second factor authentication of the user to the second factor authentication server 22. Details of this second factor test are discussed further below in reference to FIG. 3. If the second factor authentication test fails, the user is denied access to the requested information at block 56, but only if both first and second-factor authentication are successful is the user granted access to the requested resources at state 58.

Figure 3:
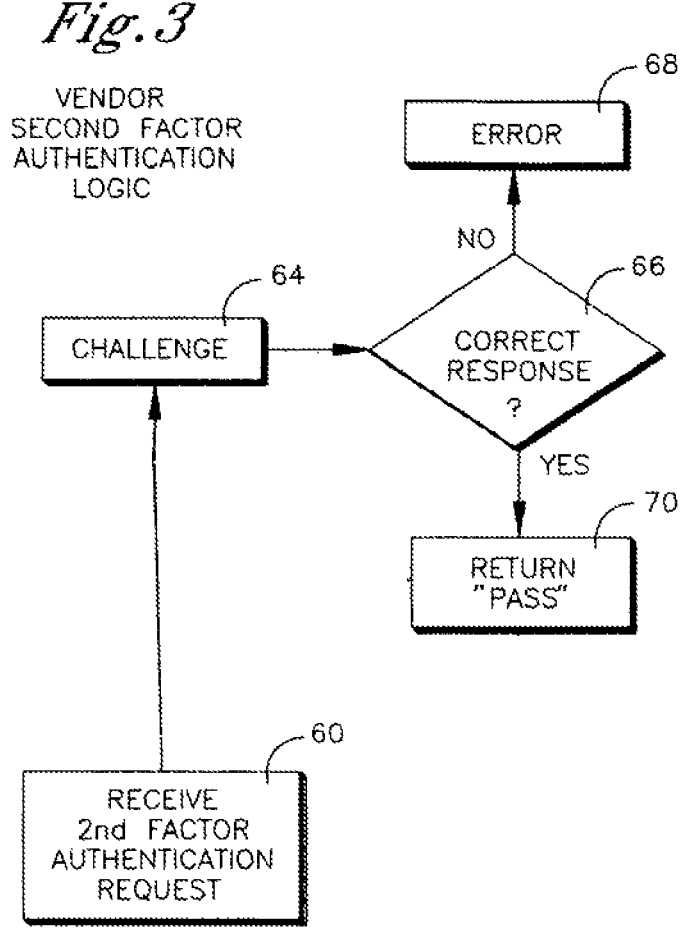
FIG. 3 is a flow chart of the vendor server logic.

Turning to second factor authentication and FIG. 3, at block 60 the request for second factor authentication pursuant to a successful first factor authentication is received at the second factor authentication server 22. At block 64, a challenge is issued. The challenge may include, but is not limited to: pass code challenge with various delivery options, e.g., phone text message, email message, IVR, etc.; security question challenges; challenges based on geographic location; mutual authentication; etc. Which challenge to use is defined by the customer server 16 as part of the user profile given to the second factor authentication server 22.

For instance, an email or wireless telephone short message service ("SMS") message or outbound telephone call using IVR principles can be sent to the user, containing a randomly generated single-use only pass code which is supplied by the second factor authentication server 22. This pass code can then be sent by the user to the second factor authentication server 22 using the client computer 12, to prove that the user is authorized access. In additional or alternative embodiments, a biometric information test may also be used to trigger this challenge or indeed after reception of the pass code to further verify user authenticity. Details of non-limiting biometric and geographic second factor authentication are set forth in one or more of the above-referenced patent applications.

If a correct response to the challenge is not received at decision diamond 66 (e.g., within a predetermined response period), an error is returned at state 68, and the user is denied access to the requested resources at block 56 of FIG. 3. The error result alternatively may entail directing the user back to the first factor authentication process described above. On the other hand, a positive result at diamond 66 moves the logic to block 70, wherein a "pass" is returned indicating that second factor authentication is successful. The user is granted access to the requested resources.

Figure 4:
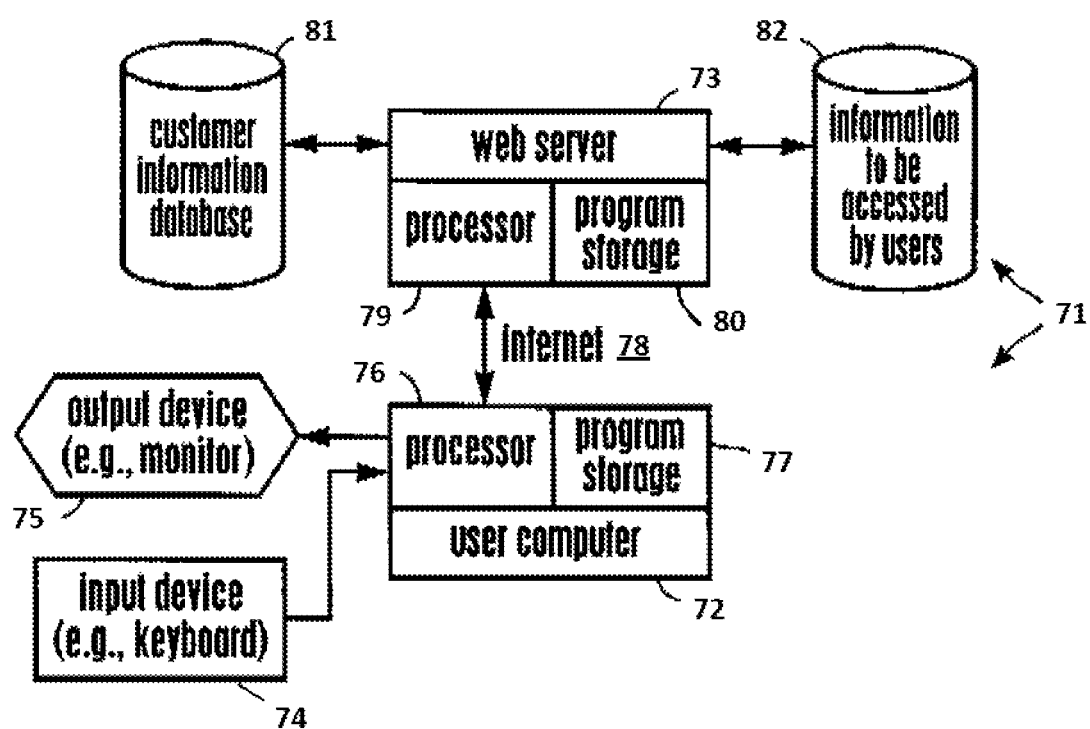
FIG. 4 is a block diagram of an alternative example of a system.

In additional or alternative aspects, FIG. 4 depicts a system 71. A user computer 72 can communicate with a Web server 73 over the Internet 78. The user computer 72 can include processor 76 and disk and/or solid-state program storage 77 for storing software embodying logic. The user computer 72 can also include one or more input devices 74 such as keyboards, mice, voice recognition devices, etc. as well as one or more output devices 75 such as monitors, printers, other computers, etc. Authentication logic executed by the system 10 may be used in applications such as but not limited to online banking, secure online e-commerce, and VPN access control.

The server 73 can include a processor 79 and disk and/or solid-state program storage 80 for storing software embodying logic including all or part of the logic discussed further below. The server 73 may access a customer information database 81 that contains the log in and registration information on users set forth further below, it being understood that the database can be pre-populated with user information on existing customers who elect to start up the present service. In addition, the server 73 may access an information database 82 to supply users with desired information, e.g., bank account records, subscription content, etc. The databases 81, 82 may be implemented in a single data structure if desired.

Figure 5:
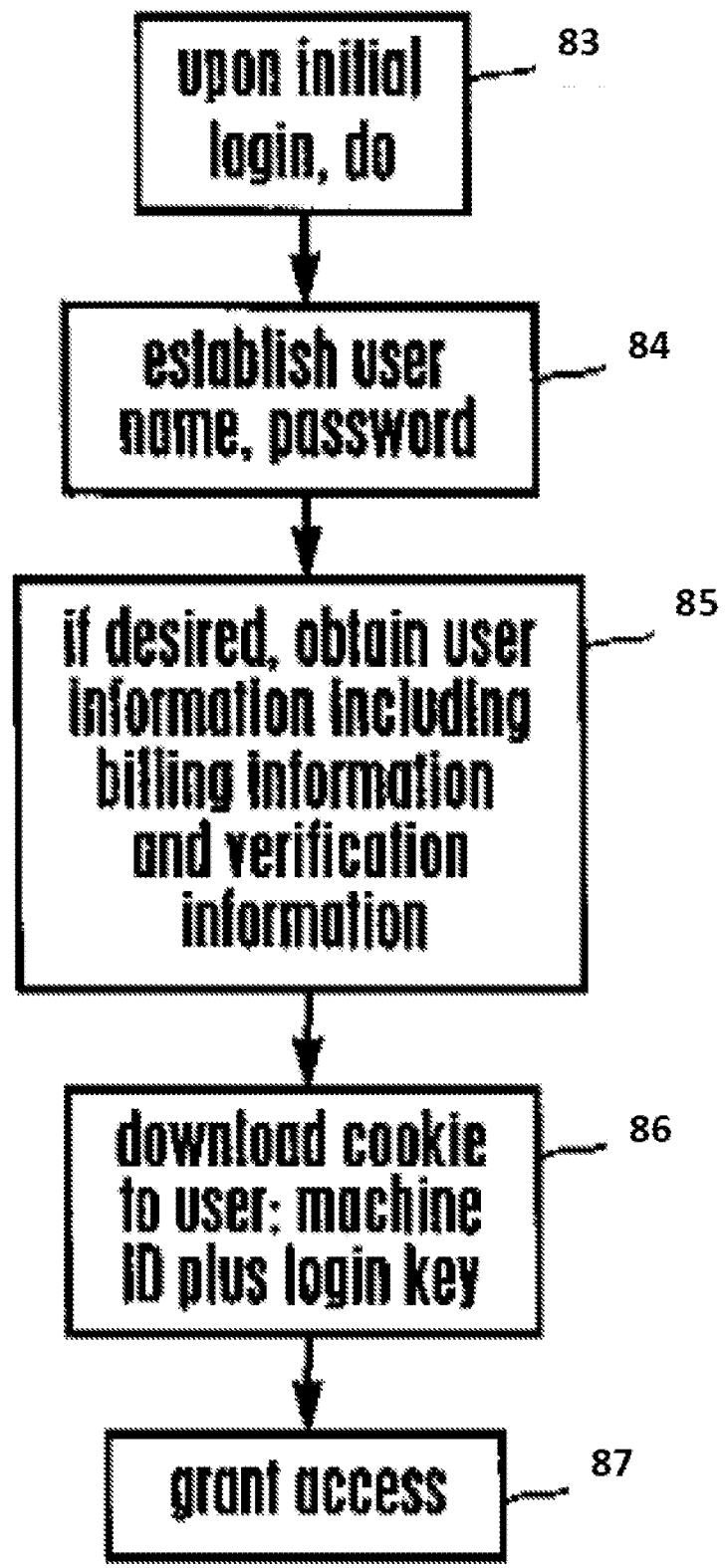
FIG. 5 is a flow chart of the registration logic.

Now referring to the initial registration logic of FIG. 5, commencing at block 83, the user logs in for the initial time. Moving to block 84, a user name and a password are established, for instance by allowing the user to select a user name and password or with the server 73 conferring a user name and password on the user. In block 85, additional user information can be obtained if desired. Such user information might include billing information and validation information. The validation information can be confidential to the user so as to protect his account from outside unwanted users who might have stolen the users account information, in accordance with further logic set forth below. It is to be understood that the validation information alternatively can be previously obtained from the user in various ways, online or off-line.

At block 86, at the same time the user registers or subsequently in the case of users who are already registered with the server for other purposes but now for the first time commence the present service, the user(s) computer is sent a verification string. The verification string is preferably but not necessarily one that does not require user interaction or special software, such as a cookie that can have a machine ID and a login key, e.g., a 4096-bit string with randomly generated value. The cookie may also have a user ID that is unique to a person. The cookie requires no special client software and is invisible to the user. Both the machine ID and the login key are randomly generated, stored on the server, and associated with that user's account. Once the users account is established, the machine ID and the login key become associated with that user's account. Access is granted if all user information and user account information is correct, shown in block 87.

Figure 6:
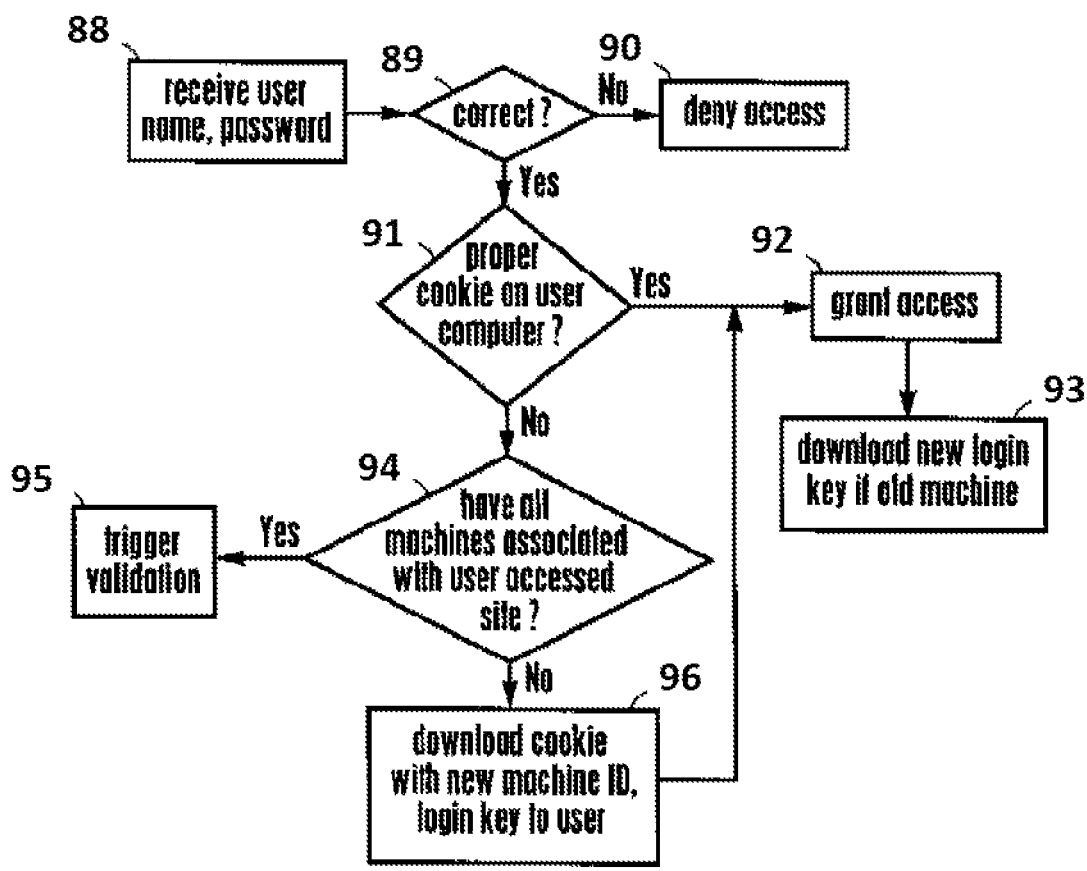
FIG. 6 is a flow chart of the subsequent log in logic.

After registration, the logic that can be implemented by the server 73 moves to FIG. 6 for subsequent attempts by the user to log on to the server 73 and access the user information contained in the database 82 shown in FIG. 4. Beginning with block 88, upon subsequent logins the user enters the user name and password. At decision diamond 89, the server checks the user name and password's validity. If the user name and password are not correct, user access is denied at block 90.

If, at decision diamond 89, it is determined that the user name and password are correct, the logic flows to decision diamond 91 wherein the server checks the user's computer to verify the correct cookie is stored on the user(s) computer by, e.g., comparing the cookie on the user's computer with server cookie records. If the server determines the cookie is present and correct, access to the user information in the database 82 is granted at block 92. Then, at block 93, assuming that the machine being used is not a newly entered machine as discussed further below in relation to block 96, a new login key carried on a new cookie preferably over an secure socket layer ("SSL") encrypted link is downloaded. This new cookie with new login key is used for the next user login using the same machine. The login key in the new cookie is different from the login key of the old cookie but the machine ID stays constant.

In contrast, if, at decision diamond 91, it is determined that the cookie on the user computer is not correct, in some optional embodiments the server 73 moves to decision diamond 94 to determine whether all the computers that have been allocated to the user have accessed the server 73. In other words, in some applications such as online banking the server may allocate to the user at registration, in response to a user request, more than a single computer (i.e., to use N computers, N>1) to access the information in the database 82. For instance, an online banking customer might want to access his bank account from both an office computer and a home computer. If all of the AN@ allocated computers that have been allocated to the user have accessed the server 73 and have been granted cookies, meaning that the currently used computer is in excess of the authorized number, user access is denied and the logic flows to block 95 to trigger a validation process. If desired, to foil a dictionary attack only a limited number of login/cookie verification attempts may be allowed from any one machine, after which the machine is locked out until successful validation occurs.

In a non-limiting implementation, the validation process can include the user entering the confidential information initially given in the initial login process. The validation information can be the user's mother's maiden name, the user's social security number, or some other information that preferably is personal to the user. The server 73 then checks the user input against the validation information that was gathered at block 85 in FIG. 5. If a match is found, validation is successful and the user is granted access; otherwise, validation is unsuccessful and access is denied.

In some implementations, the validation process can include sending an email to the user. The email can contain a hyperlink to a Web site at which a new cookie that is valid for accessing the data may be obtained. If desired, access to the Web site at which a new cookie may be obtained can be disabled after the user clicks once on the hyperlink. In additional or alternative embodiments, the validation process can include prompting the user to call a telephone number to verify predetermined information, or to access a Web site to verify predetermined information online. Once validation is successful, the server 73 permits access to the information in the database 82.

In contrast, if the server determines at decision diamond 94 that not all machines that have been allocated have accessed the server 73, a new cookie with a new machine ID and login key is downloaded to the new computer at block 96. The logic then loops back to block 92 to grant access, in some embodiments only after having triggered the validation first as described at block 95 to ensure that the correct user is logging in.

In the context of adding a new machine when more than a single user computer is authorized, the new machine can be automatically added at its first login in accordance with the logic above (assuming the above-described conditions have been met), or the server can ask the user of the new machine whether the new machine is to count as one of the N authorized machines, temporarily or otherwise. If the user indicates that the machine is to be temporary only (e.g., if the user is operating a terminal at a hotel), the user could specify an expiration date and/or number of logins after which any access to the user information from that machine would be denied, or at the least would trigger the verification process once again. This can be done by causing the cookie to be designated "expired" at the end of the period. For instance, at an in-hotel room terminal, a user might specify an expiration at the expected check out time, or a user could specify a number of logins to allow from that machine before the verification process is triggered again. The expiration information is stored at the server. When a machine expires, the number of new machines remaining to be added to the user's account may be reset by one. In contrast, the user would not be asked for temporary use information when communicating with the server from a core set of computers from which the user has authorized permanent access. One or more pieces of the above information that is transmitted between computers maybe encrypted using, e.g., AES encryption.

Figure 7:
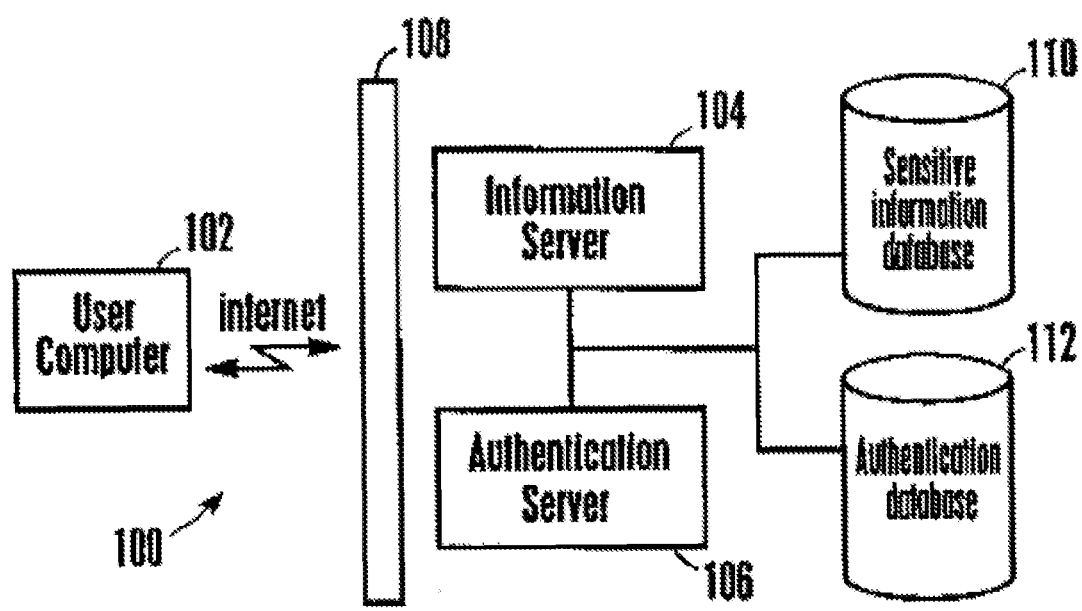
FIG. 7 is a block diagram of another non-limiting example system.
Figure 8:
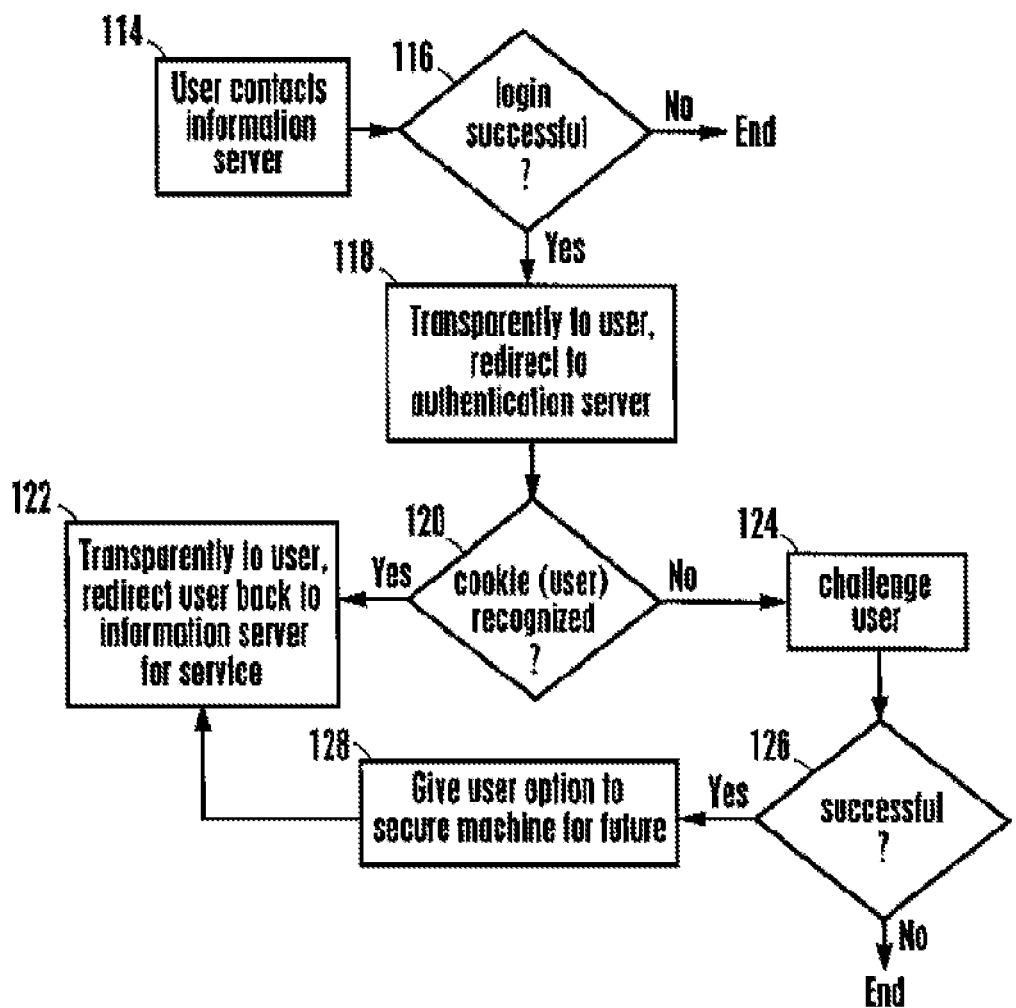
FIG. 8 is a high level flow chart of the logic used by the system shown in FIG. 7.

FIGS. 7 and 8 show specific implementations of the above logic and system. For simplicity, FIG. 7 omits certain details such as input devices and output devices. A system 100 can include one or more user computers 102 that communicate via the Internet with, e.g., an information server 104 of a financial institution. The information server 104 communicates with an authentication server 106. Both the servers 104, 106 preferably are behind a firewall 108. While only a single information server 104 and only a single authentication server 106 are shown, it is to be understood that server clusters can be used. For instance, J2EE clusters that use memory replication session persistence can be used, where individual objects in the HTTP session are serialized to a backup server as they change, providing high performance and scalability. Also, when the authentication server 106 is behind the firewall 108, the use of SSL may not be necessary, although if access is required from an Extranet, SSL may be used.

In any case, the purpose of the system 100 is to permit controlled access of the user computer 102 to data in a sensitive information database 110, using authentication information in an authentication database 112. The information server 104 and sensitive information database 110 may be the conventional server/database used by, e.g., a financial institution, with the exceptions noted below. In contrast, the authentication server 106 and authentication database 112 may be add-ons in accordance with present principles. In any case, the databases herein may be, e.g., SQL servers, DB2 servers, Oracle servers, or lower end servers such as MySQL.

The logic of an example implementation of the logic is shown in FIG. 8. FIG. 8 shows a high-level logic flow that may be implemented by the system 100 shown in FIG. 7. Commencing at block 114, the user contacts the information server 104 using the user computer 102. This contact usually entails an initial authentication such as a login process that includes entering a user name and password. If the login process fails at decision diamond 116 the logic ends, but if it is successful the present invention proceeds to block 118, wherein user computer communication, transparently to the user, is transferred to the authentication server 106. Communication between the servers 104, 106 may use SOAP principles known in the art.

At the authentication server 106, it is determined at decision diamond 120 whether the machine is recognized (using the machine ID in the above-disclosed cookie) and has been previously secured by the user (using the login key). This can be thought of as a secondary authentication process. If the test passes, the logic moves to block 122 to (transparently to the user) transfer the user back to the information server 104 for further service, e.g., for online banking transactions. On the other hand, if the test at decision diamond 120 fails, the logic can move to block 124 to challenge the user in accordance with principles set forth herein, which challenge might be thought of as a tertiary authentication process. For instance, an email or wireless telephone SMS message or outbound telephone call using IVR principles can be sent to the user, containing a randomly generated single-use only personal identification number ("PIN") code that is supplied by the authentication server 106. This single-use PIN code can then be sent by the user to the authentication server 106 using the user computer 102, to prove that the user is authorized access. The below-described biometric information test may also be used to trigger this challenge or indeed after reception of the PIN code to further verify user authenticity.

If the challenge is met successfully at decision diamond 126, the user is given the option at block 128 of securing the specific machine being used for future use, and then the user is redirected to the information server at block 122. Otherwise, the process ends without giving the user access.

Figure 9:
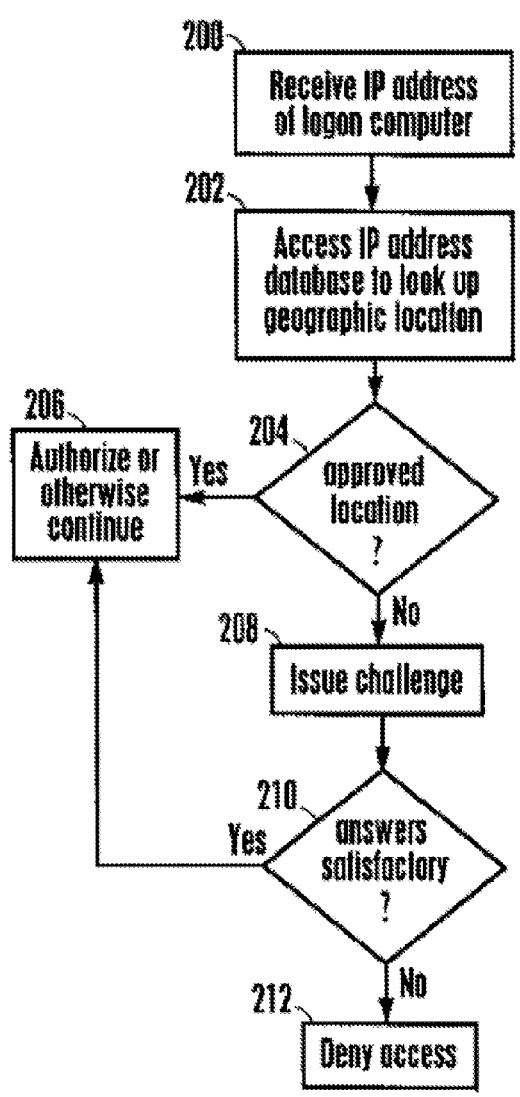
FIG. 9 is a flow chart of geographic verification logic.

Now referring to FIG. 9, in addition to (e.g., at any convenient point in the logic) or indeed in lieu of the logic of FIG. 7 or 8, geographic location can be used to determine whether to challenge a user to provide additional authentication information. In the example shown in FIG. 9, the IP address of a computer attempting to gain access is received by the authentication server, which accesses a database of IP addresses at block 202 that correlates IP addresses to geographic location, typically country, state, city, and postal code. Other examples of geographic location can be ISP (since the ISP has a location related to the user attempting to log on), and time zone. In addition, geographic location can be tied to a location type, e.g., a cyber cafe. In any case, the database may be obtained from or operated by an independent entity. Using the IP address as entering argument, the geographic location associated with the IP address is obtained.

Proceeding to decision diamond 204, it is determined whether the geographic location, e.g., country and/or state and/or city and/or postal code and/or time zone and/or ISP identity and/or location type, e.g., a cyber cafe, is an approved location. This determination may take on several facets. For example, a list of "disapproved" locations may be implemented, and if the looked-up geographic location is not on the list, the test at decision diamond 208 is positive. In additional or alternative embodiments, a list of only approved locations may be implemented, and only if the looked-up geographic location is on the list is the test at decision diamond 206 positive. Yet again, a combination of the two lists may be used, so that, for example, entire countries may be placed on a "disapproved list" and if the geographic location is not on the "disapproved" list, the logic accesses an "approved list" to determine, e.g., whether the particular postal code is an approved postal code or not.

One non-limiting way to determine whether a location should be approved or not is to observe the IP addresses associated with failed log in attempts and note whether a disproportionate number of failed attempts comes from IP addresses associated with a particular location.

If the geographic location is approved, access authorization is granted at block 206. In the alternative, depending on where the logic of FIG. 9 is implemented in conjunction with other authentication logic, e.g., depending on where the geographic location logic is inserted into the flow of FIG. 7 or 8, the remaining authentication process is allowed to proceed.

In contrast, if the geographic location is not approved, the logic may simply end without granting access, but more preferably the logic flows to block 208 to issue a challenge such as one of the above-mentioned challenges. The user's response to the challenge is tested at decision diamond 210 for sufficiency, and if the user successfully responds to the challenge the logic loops back to block 206. Otherwise, access is denied at block 212.

In addition to using geographic location as a test, biometric information may be used. For example, the logic of FIG. 9 may replace the geographic location test with a biometric test, e.g., to determine whether the user's voice as might be received over a VoIP connection matches an approved voice. A successful match may precipitate access authorization or at least permission to undertake the remaining logic of FIG. 7 or 8, for instance. Other biometric tests such as eye recognition or fingerprint recognition may be used.

Figure 10:
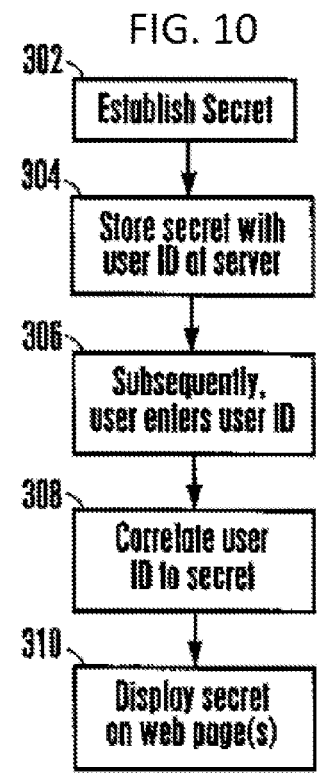
FIG. 10 is a flow chart of logic for verifying the authenticity of a website.

Now referring to FIG. 10, in addition to the above logic, logic may be provided to confirm for a user the authenticity of the website. Beginning at block 302, the user establishes a secret with the web site. This unique secret is known only to the particular user and the site itself, and may be a word, sentence, or random character string selected by the user. At block 304 the web site stores the unique secret associated with the user's unique identifier in the web site's database (i.e., secrets and respective user IDs are stored on a one-to-one relationship basis) so that the secret may be displayed to the user when the user accesses web pages associated with the authentic web site.

Once the initial secret has been established, at block 306 a user must enter at least one unique identifier, such as a user name and/or a password. This identifier is referenced at block 308 by the genuine website, which recognizes the unique identifier. Once the unique identifier has been associated with the particular user, the logic concludes at block 310 where the secret associated with (and, recall, determined by) the particular user can be displayed on the page being viewed. In some implementations, the secret is displayed on every subsequent page of the web site, including the rest of the login pages such as a page where a password must be entered or any alternative or additional validation steps that may be associated with a login.

By displaying the unique secret, the website enables the user to verify the authenticity of the site. A false, or "phished," site would not display the unique secret on each page. Only an authentic site will display the unique secret on subsequent screens because the unique secret can only be produced by the authentic website. If the unique secret is not displayed or does not match the predetermined secret created at block 202, then the user may determine that the site being displayed is not the authentic site the user intends to access and take steps accordingly, such as alerting the user's bank by phone.

In some implementations, the features above may be provided to customers of the system in what might be thought of as a "cocktail" approach in which a customer may select some features (custom security questions, defined security questions, pass code (sometimes referred to as a one-time PIN) via email, pass code via SMS, pass code via IVR, pass code via voice biometrics, and verification link) and authentication criteria (device ID I encrypted cookie, login count, location (country, state, city and zip code) as well as network information such as ISP and browser version) to choose from based on their customer (obtrusiveness and convenience) and security (what threats are they mostly concerned with) needs.

Moreover, the above-described features are not necessarily constrained to Web applications. For example, the systems and methods described above may be implemented in virtual private networks, automatic teller machines, operating systems, PDNSmart Phone (wireless) devices, and other non-web applications.

As indicated above, there may be times when the two-factor authentication provided by the login information (user ID and password) and cookie information (including machine ID and one-use only login key) may need to be supplemented by additional authentication steps. In addition, the present invention provides a way for individual customer institutions, e.g., banks to further tailor authentication if they so desire by requiring various authentication steps even when the login information and cookie information are found to be valid.

Figure 11:
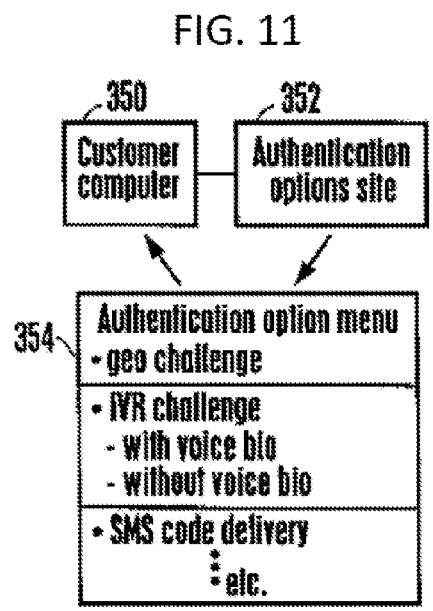
FIG. 11 is a schematic block diagram of an architecture to allow a customer to select authentication methods.

In other words, some non-limiting implementations of the present invention can adopt a holistic approach to authentication in providing an authentication framework with a unique set of security tools and configuration options for each customer. A number of different authentication challenges can be triggered when suspicious transactions, policy violations or out-of-norm behavior is recognized. These security options can be customized by a client institution such as a bank and configured for different user groups through a centralized administration console in real time, as shown in FIG. 11 and described further below. The solution is completely software based and does not require any hardware tokens or client-side software downloads although it could easily be extended to include non-software based components. The solution can either be deployed onsite behind customer firewalls and proxies or as a service. This services-based model allows organizations to invoke desired authentication services from anywhere in the world leveraging shared hardware and software resources from a centralized location. The solution delivers multi-factor authentication through the use of every day devices that are already in the hands of end users, such as cell phones, home phones, web connected computers, and office phones. This dramatically lowers the cost and greatly reduced the complexity of providing strong authentication to a large, diverse population. Example embodiments of the system can also provide end users with real time fraud alert that is triggered any time a fraudster is able to produce a password linked to a given user name.

As shown in FIG. 11, a customer institution can use an enterprise customer computer 350 to access an authentication options web site 352 to select authentication features from a graphical user interface ("GUI") such as the non-limiting screen display 354 shown in FIG. 11, it being understood that the screen 354 is provided by the web site 352 to the enterprise customer computer 350. As shown, one or more of a number of different authentication methods can be selected using the GUI, including SMS delivered pass code to a wireless phone, voice delivered pass code to a wireless or landline phone using IVR discussed further below in reference to FIG. 13, voice delivered pass code to a wireless or landline phone using voice biometric speaker identification, text delivered pass code to an email account, user defined security questions, institution defined security questions, email delivered verification link and knowledge based authentication from both public and private data sources. In addition, a number of configuration options may be provided to dictate criteria for when to provide stronger authentication by invoking further challenges on the end user. Those include, in addition to checking for a proper device ID (cookie), login counts and patterns, behavior analytics, location based analytics via IP geo-location and network based analytics and comparisons.

Furthermore, the institution may be permitted to choose a number of additional configuration options for the voice biometric feature discussed below in reference to FIG. 12. This can include the number of devices required for enrollment, whether enrollment is optional or required, the frequency with which end users much re-enroll, the language the system speaks in to deliver the pass code, the number to dial to access the voice system, the expiration time of the session ID, and the expiration time of the pass code. This authentication method can be used in combination with any other authentication method in the solution set.

As recognized herein, this layered approach of providing authentication options for the customer institution to configure based on perceived security threats, user intrusiveness, flexibility and intuitiveness in real time provides an extremely powerful solution that allows the customer institution to maximize adoption and reinforce loyalty.

Figure 12:
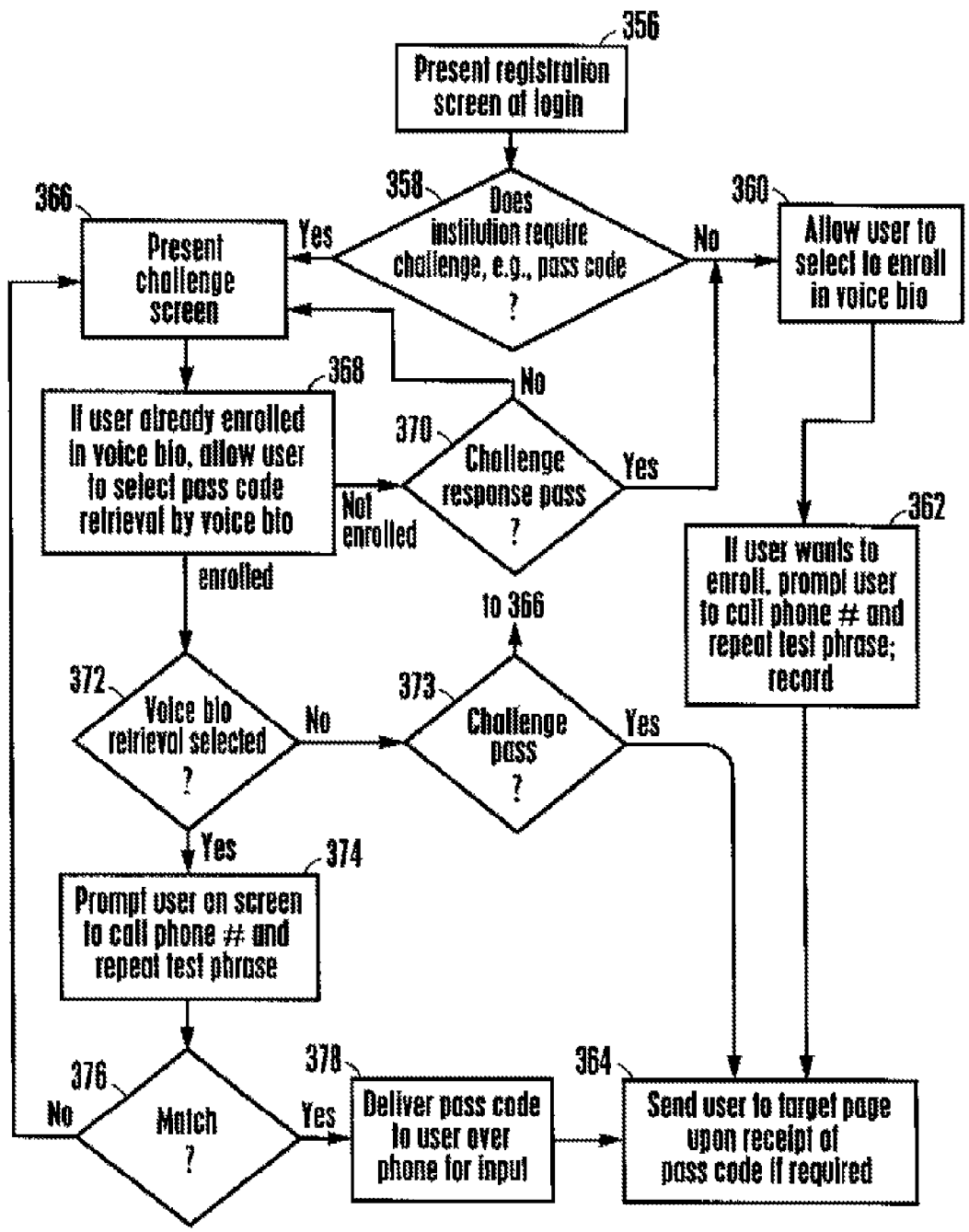
FIG. 12 is a flow chart of example logic for selecting example features in the architecture of FIG. 11.

FIG. 12 shows non-limiting logic that can be used to enroll end users (such as bank customers) of a client enterprise (such as a bank) to enroll in a voice biometric system that allows the end users to retrieve individual pass codes by calling a number and having their voiceprint authenticated. This authentication method can be used either as a backup option in case the end user's primary delivery method (email, text message or voice) fails to deliver the pass code or as a primary authentication method.

Beginning at block 356, a registration screen is displayed to a user at login. In some embodiments, the following logic may be invoked only upon receipt of proper login name and password and verification that the previously deposited cookie is present on the user's machine in accordance with above principles.

Assuming login and cookie verification are successful when these tests are required, the logic moves to decision diamond 358 to determine whether the particular institution into which the user is trying to gain access has imposed a further authentication requirement in the form of proper entry of a one-time pass code that is different from the password described above. If not, at block 360 the user is permitted to enroll in a voice biometric program, wherein if the user wishes to enroll, he is prompted at block 362 to call a predetermined phone number, enter a session ID number if desired, and repeat a predetermined phrase a predetermined number of times. The user's voice is recorded and correlated to the user's name, and then the user is sent to the target page of the institution at block 364. When the user does not wish to enroll and no pass code is required by the institution, the user is sent directly to the target page from block 360.

On the other hand, when the institution has levied the additional requirement of proper receipt of a one-time pass code, the logic moves from decision diamond 358 to block 366 to present a challenge screen to the user, demanding entry of the one-time code. As mentioned above, the pass code may be delivered via a secondary channel upon successful login in one of various ways, e.g., by SMS text message to the user's phone, email, etc. In some implementations, these are primary delivery mechanisms and the below-described IVR is secondary; in other implementations, IVR is primary.

Block 368 indicates that if the user is found to be enrolled in voice biometrics he can be permitted to choose to receive the pass code by voice biometrics. This might be the user's choice when, for instance, a primary pass code delivery mode did not work properly (e.g., if the user's email server is down), and the user cannot otherwise obtain the pass code for input. Or, it can be the user's choice when the voice delivery of the pass code is the primary delivery mode.

If the user is not already enrolled in voice biometrics, the logic can move to decision diamond 370 to determine whether the user input the correct pass code on his user computer in response to the onscreen challenge at block 366. If not, the challenge screen is presented again. If the user successfully input the pass code, however, the logic may move to block 360 to allow the user to enroll in voice biometrics as described above, eventually sending the user to the target page at block 364 in accordance with previous disclosure.

Returning to block 368, if the user is enrolled but elects not to retrieve the pass code via voice biometrics at decision diamond 372, the user can be sent to the target page at block 364 assuming proper entry at decision diamond 373 of the pass code, which has been delivered to the user by the other means discussed above. Of course, as indicated by decision diamond 373 if the user fails to enter to correct one-time pass code in response to the challenge the process reverts to block 366.

If the user chooses to obtain the pass code by voice biometrics at decision diamond 372, the process can move to block 374. A screen can be presented to the user prompting the user to call a predetermined phone number, enter a session ID number if desired, and repeat a predetermined phrase. If a match with the voice biometrics recorded during enrollment at block 362 is found at decision diamond 376, the logic may move to block 378 to deliver the pass code to the user by automated voice over the phone. The logic of FIG. 13 may be invoked for this purpose, or the pass code may be immediately delivered in the same telephone call to the user. Upon proper entry of the pass code into the challenge screen the user can be directed to the target page at block 364. Failure of a voice biometric match at decision diamond 376 may result in looping back to block 366 as shown.

The user may update his test voice print if desired by being presented an update page, which can be selected to re-invoke the enrollment process discussed above. When analyzing the user's voice both during enrollment and subsequent pass code delivery, the invention may analyze voice samples for both audio quality and consistency. End users must repeat the same phrase essentially the same way. If the samples have good audio quality and sound similar to each other, they are accepted by the system.

Figure 13:
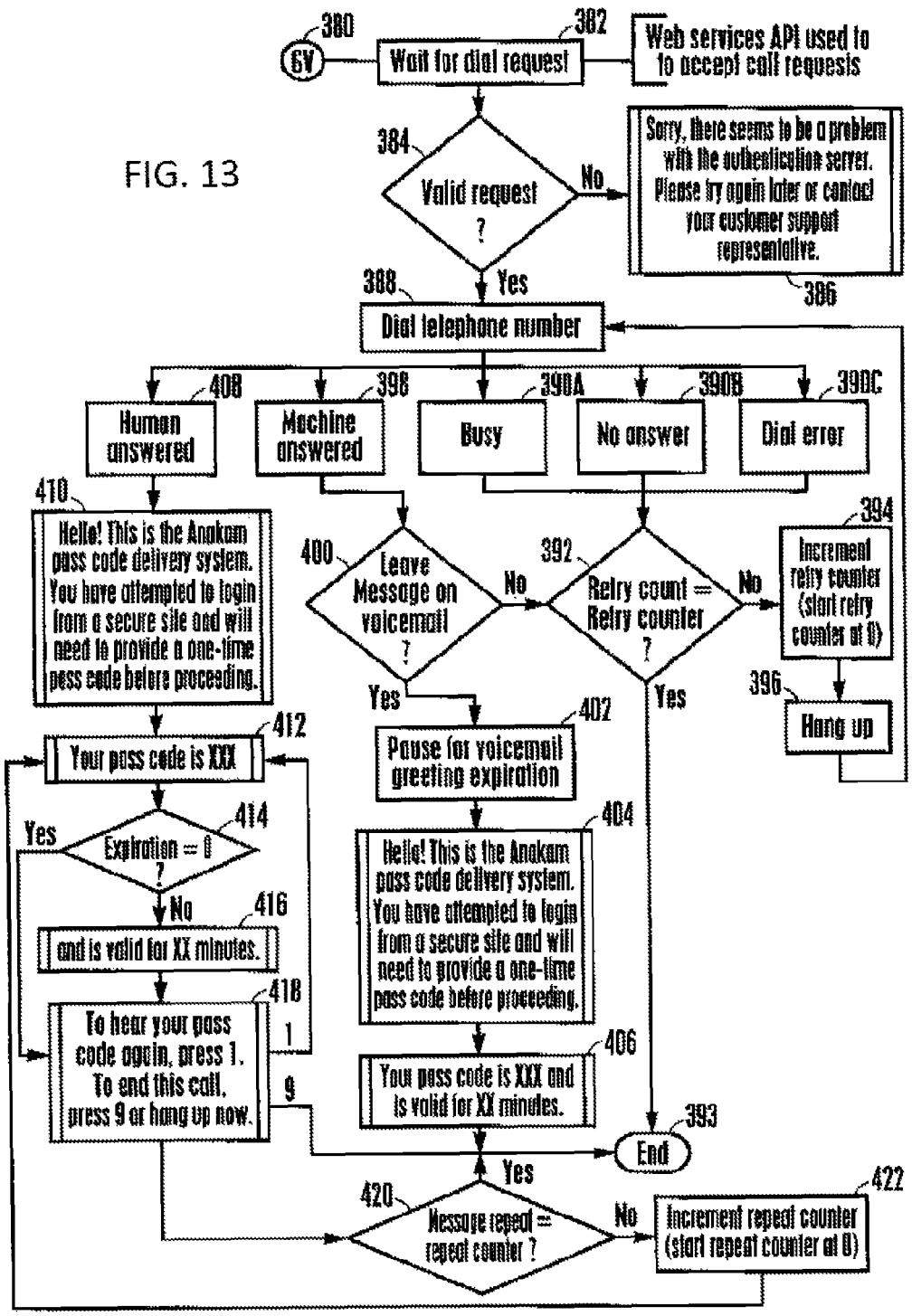
FIG. 13 is example logic for using interactive voice response for authentication.

FIG. 13 shows how a one-time pass code can be delivered to a user by means of IVR. In summary, the IVR feature may place an outbound call and transmit a spoken one-time pass code to a wireless or land line phone that has been preregistered by the end user. The administration screen 354 shown in FIG. 11 may permit the institution to define a number of different configuration options for the IVR feature. These can include the language the system speaks to deliver the pass code, whether the pass code should be delivered to voice mail if the end user does not answer or is not reachable, the number of times the pass code should be repeated, the number of times the outbound call is made if there is no answer, and the expiration time of the pass code. This authentication method can be used in combination with any other authentication method in the solution set.

Turning to the details of FIG. 13, beginning at start state 380 the system waits for a dial request at block 382. Web services application programming interfaces (API) can be used to accept call requests. If no valid request is received at decision diamond 384, a message can be presented to the user at block 386 to the effect that pass code delivery cannot be made.

On the other hand, when a valid request is present at decision diamond 384 the logic can move to block 388 to dial the user's telephone number. If the phone is busy (block 390A) or there is no answer (block 390B) or there is a dial error (block 390C), the logic may move to decision diamond 392 to determine if a dial retry count (which equals the number of dial attempts made since a valid request was received at decision diamond 384) equals a predetermined counter, and if so the process ends at state 393. Otherwise, the retry count may be incremented at block 394, the systems can disconnect at block 396, and then loop back to block 388 to redial.

If, at block 398, a user's answering machine answers the call that was placed at block 388, the logic can proceed to decision diamond 400 to determine whether the institution and/or user has permitted a pass code message to be left on the machine. If not, the logic can move to decision diamond 392 to proceed as explained above. If a message has been authorized, however, the logic can move to block 403 to pause to wait for the recorded greeting to end, and then to audibly deliver an introduction message if desired at block 404 prior to audibly delivering the pass code at block 406, along with a time for which the code will remain valid, if this feature has been enabled by the institution. The process then ends at state 393.

If, at block 408, a user's live voice answers the call that was placed at block 388, the logic may audibly deliver an introduction message if desired at block 410 prior to audibly delivering the pass code at block 412. If a time for which the code will remain valid has been enabled by the institution as indicated by a negative test at decision diamond 414, the user may be audibly informed at block 416 of the length of time the code will remain valid. In either case, the user may be given the option of repeating the code at block 418, which if selected causes the logic to loop back to block 412. If desired, a message repeat limit can be set, in which case the logic can determine at decision diamond 420 whether the message has repeated the predetermined number of times, incrementing a repeat counter at block 422 when it has not and otherwise ending at state 393 when it has.

While the particular SYSTEM AND METHOD FOR SECOND FACTOR AUTHENTICATION SERVICES is herein shown and described in detail, it is to be understood that the subject matter, which is encompassed by the present invention, is limited only by the claims.

What is claimed is:

1. A method for selectively granting access to data by a user, the method comprising:
    providing a plurality of second-factor authentication options for selection by a first user and a second user, the plurality of second-factor authentication comprising a one-time passcode option and a security question option;
    receiving, by a processing device, a first request for access to first data from a first user computer via a first type of communication channel and a second request for access to second data from a second user computer via the first type of communication channel;
    providing first factor authentication of the first user and the second user, wherein the first factor authentication for the first user comprises determining that a first user name and a first password received from the first user computer via the first type of communication channel are valid and the first factor authentication for the second user comprises determining that a second user name and a second password received from the second user computer via the first type of communication channel are valid;
    performing, by the processing device, second factor authentication of the first user responsive to determining that the first user name and the first password are valid, the second factor authentication of the first user comprising:
        determining that the first user has selected the one-time passcode option, and
        based on determining that the first user has selected the one-time passcode option, identifying a second type of communication channel for providing a one-time passcode in a human-readable language to the first user, determining that the second type of communication channel is unavailable, providing the one-time passcode over a third type of communication channel in response to determining that the second type of communication channel is unavailable, and granting access to the data to the first user computer in response to receiving the one-time passcode over the first type of communication channel; and
    performing, by the processing device, second factor authentication of the second user responsive to determining that the second user name and the second password are valid, the second factor authentication of the second user comprising:
        determining that the second user has selected the security question option, and
        based on determining that the second user has selected the security question option, providing a plurality of security questions to the second user and granting access to the data to the second user computer in response to receiving correct answers to the plurality of security questions.

2. The method of claim 1, wherein the plurality of second-factor authentication options further comprises a biometric verification option, wherein the second factor authentication for the first user further comprises:
    determining that the first user has also selected the biometric verification option from the plurality of second-factor authentication options;
    receiving an audible phrase from the first user over the third type of communication channel; and
    granting access to the data to the first user computer in response to determining that the audible phrase matches a stored biometric.

3. The method of claim 1, wherein providing the plurality of second-factor authentication options for selection by the first user comprises providing a graphical interface to a computer associated with the first user, wherein at least one second-factor authentication option comprising the one-time passcode option selected by the first user is identified from input received to the graphical interface.

4. The method of claim 1, wherein providing the one-time passcode in a human-readable language to the first user over the third type of communication channel comprises providing the one-time passcode over a telephone communication channel.

5. The method of claim 4, further comprising verifying a voice biometric over the telephone communication channel.

6. The method of claim 1, wherein the second factor authentication for the first user further comprises verifying a voice biometric for the first user.

7. The method of claim 1, further comprising:
    identifying at least one additional second-factor authentication option from the plurality of second-factor authentication options; and
    performing the at least one additional second-factor authentication option in combination with at least one of (i) performing the second factor authentication for the first user that comprises providing the one-time passcode and (ii) performing the second factor authentication for the second user that comprises providing the plurality of security questions.

8. The method of claim 1, wherein one of the second type of communication channel or the third type of communication channel is a short message system channel or an e-mail channel for providing the one-time passcode as textual content, wherein another of the second type of communication channel or the third type of communication channel is a voice communication channel for providing the one-time passcode as audio content.

9. A system for selectively granting access to data by a user, the method comprising:
    a processing device; and
    a non-transitory computer-readable medium accessible by the processing device;
    wherein the processing device is configured to execute logic embodied in the non-transitory computer-readable medium and thereby perform operations comprising:
        providing a plurality of second-factor authentication options for selection by a first user and a second user, the plurality of second-factor authentication comprising a one-time passcode option and a security question option, receiving, by a processing device, a first request for access to first data from a first user computer via a first type of communication channel and a second request for access to second data from a second user computer via the first type of communication channel, providing first factor authentication of the first user and the second user, wherein the first factor authentication for the first user comprises determining that a first user name and a first password received from the first user computer via the first type of communication channel are valid and the first factor authentication for the second user comprises determining that a second user name and a second password received from the second user computer via the first type of communication channel are valid, performing second factor authentication of the first user responsive to determining that the first user name and the first password are valid, the second factor authentication for the first user comprising (i) determining that the first user has selected the one-time passcode option and (ii) based on determining that the first user has selected the one-time passcode option, identifying a second type of communication channel for providing a one-time passcode in a human-readable language to the first user, determining that the second type of communication channel is unavailable, providing the one-time passcode over a third type of communication channel in response to determining that the second type of communication channel is unavailable, and granting access to the data to the first user computer in response to receiving the one-time passcode over the first type of communication channel, and performing second factor authentication of the second user responsive to determining that the second user name and the second password are valid, the second factor authentication of the second user comprising (i) determining that the second user has selected the security question option, and (ii) based on determining that the second user has selected the security question option, providing a plurality of security questions to the second user and granting access to the data to the second user computer in response to receiving correct answers to the plurality of security questions.

10. The system of claim 9, wherein the plurality of second-factor authentication options further comprises a biometric verification option, wherein the second factor authentication for the first user further comprises:

determining that the first user has also selected the biometric verification option from the plurality of second-factor authentication options;

receiving an audible phrase from the first user over the third type of communication channel; and granting access to the data to the first user computer in response to determining that the audible phrase matches a stored biometric.

11. The system of claim 9, wherein providing the plurality of second-factor authentication options for selection by the first user comprises providing a graphical interface to a computer associated with the first user, wherein at least one second-factor authentication option comprising the one-time passcode option selected by the first user is identified from input received to the graphical interface.

12. The system of claim 9, wherein providing the one-time passcode in a human-readable language to the first user over the third type of communication channel comprises providing the one-time passcode over a telephone communication channel.

13. The system of claim 12, wherein the processing device is further configured by executing the logic to perform additional operations for performing the second factor authentication of the first user, the additional operations comprising:

verifying a voice biometric over the telephone communication channel.

14. The system of claim 9, wherein the processing device is further configured by executing the logic to perform additional operations for the second factor authentication of the first user, the additional operations comprising:

verifying a voice biometric over the third type of communication channel.

15. The system of claim 9, wherein the processing device is further configured by executing the logic to perform additional operations comprising:

identifying at least one additional second-factor authentication option from the plurality of second-factor authentication options selected by at least one of the first user and the second user; and performing the at least one additional second-factor authentication option in combination with at least one of (i) the second factor authentication of the first user that comprises providing the one-time passcode and (ii) the second factor authentication of the second user that comprises providing the plurality of security questions.

16. The system of claim 9, wherein one of the second type of communication channel or the third type of communication channel is a short message system channel or an e-mail channel for providing the one-time passcode as textual content, wherein another of the second type of communication channel or the third type of communication channel is a voice communication channel for providing the one-time passcode as audio content.

* * * * *